March 14, 1967 W. W. JACKSON 3,308,891
TOOL CARRIER
Filed Oct. 19, 1964 4 Sheets-Sheet 4
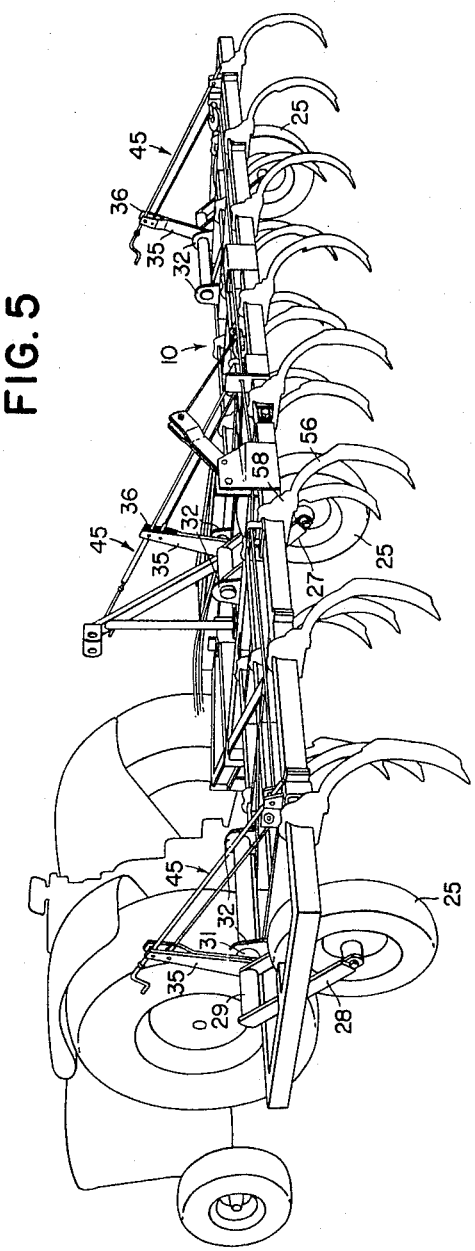
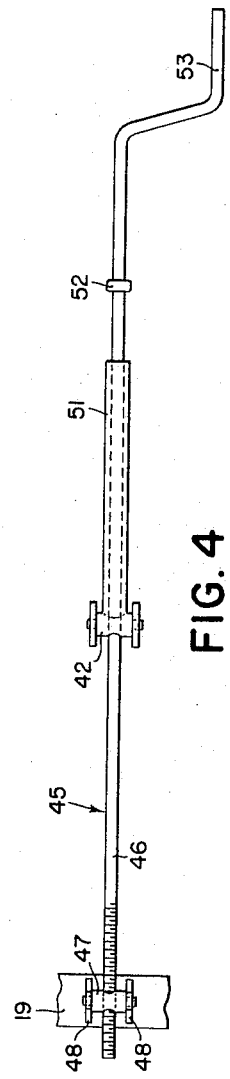
INVENTOR.
WILLIAM W. JACKSON

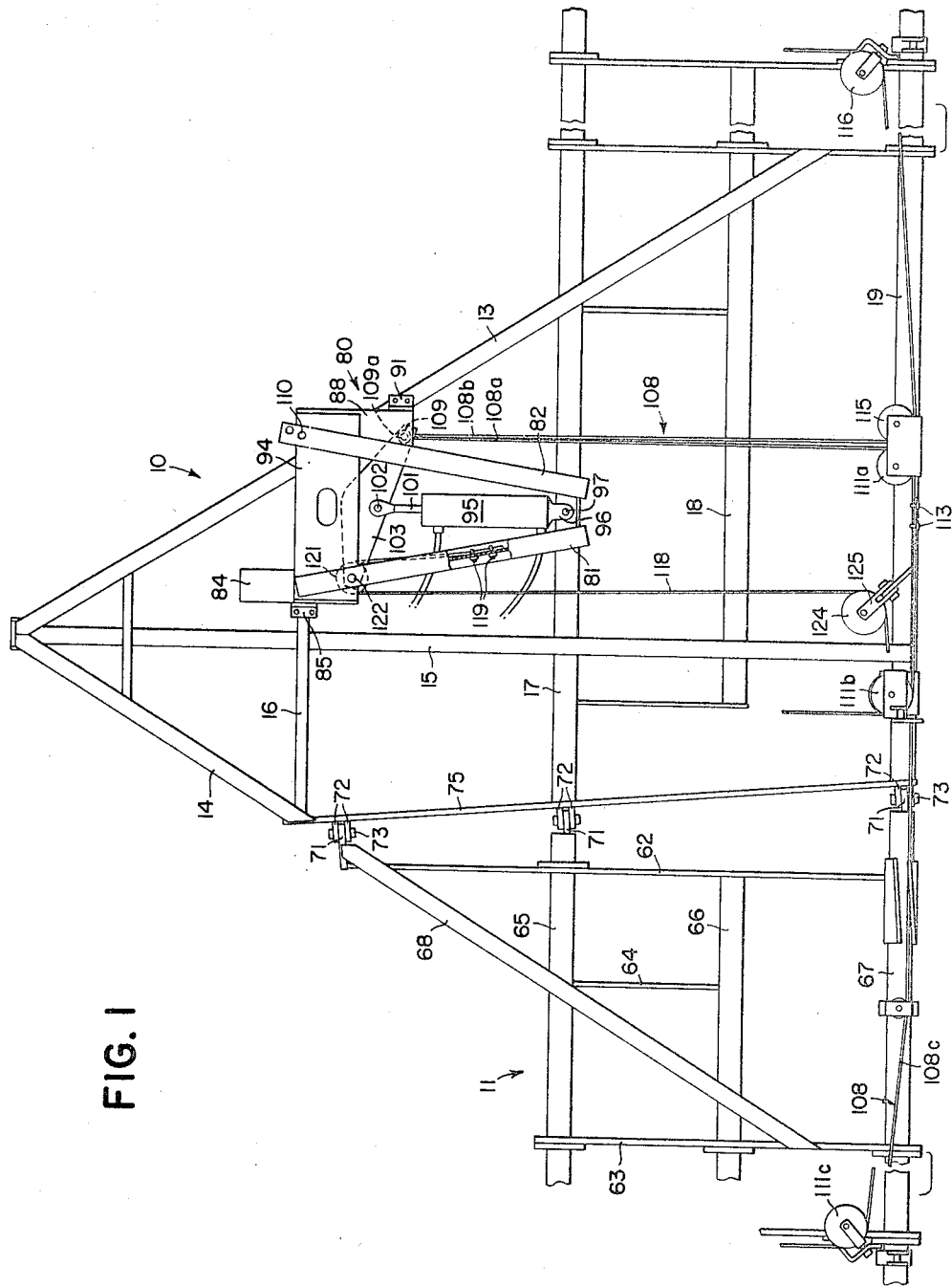

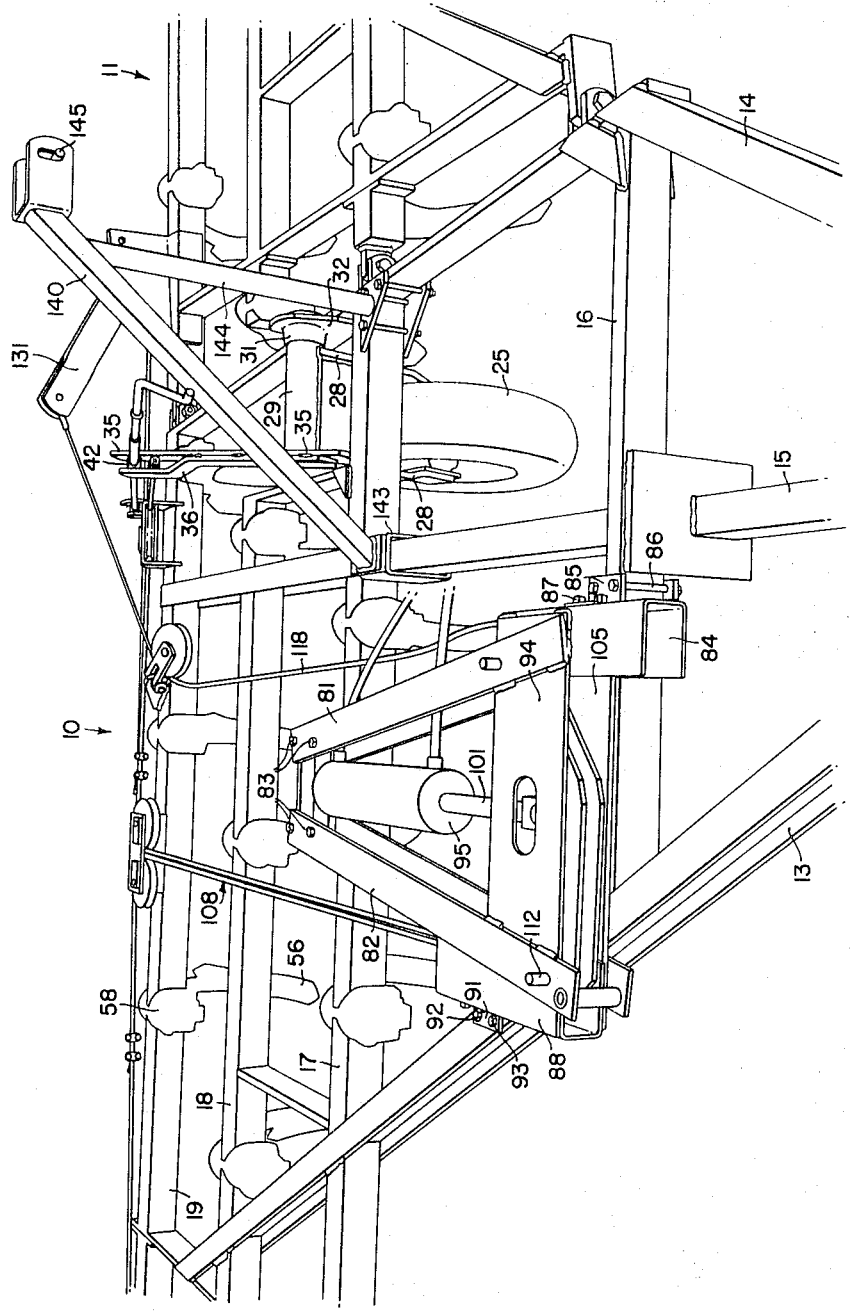

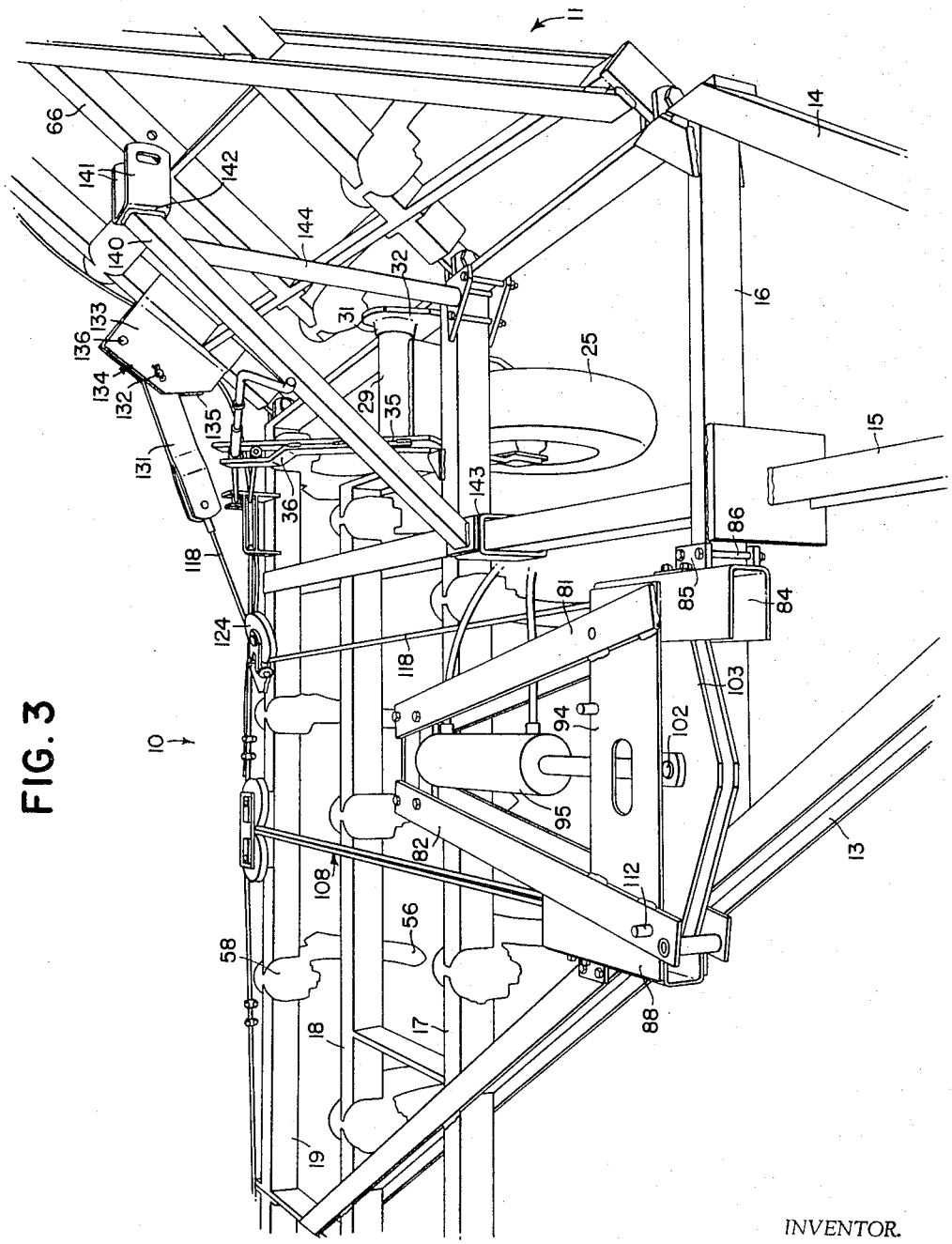

United States Patent Office 3,308,891
Patented Mar. 14, 1967

3,308,891
TOOL CARRIER
William W. Jackson, Altoona, Iowa, assignor to Deere & Company, Moline, Ill., a corporation of Delaware
Filed Oct. 19, 1964, Ser. No. 404,611
10 Claims. (Cl. 172—456)

The present invention relates generally to agricultural implements and more particularly to heavy duty cultivators, particularly those sometimes referred to as chisel plows, for making deep seed beds, killing weeds, heavy duty field cultivating, renovating pasture and alfalfa, subsurface cultivating, shallow subsoiling, and stubble-mulch and fallow tillage.

The object and general nature of this invention is the provision of an agricultural implement of the above-mentioned type, having new and improved means for raising and lowering the implement into and out of transport and working positions, and a further feature of this invention is to provide such an implement with an outrigger section, whereby the range of operation may be increased or decreased, as desired, with new and improved means for controlling the raising and lowering of the main frame and the raising and lowering of the outrigger section.

An additional feature of this invention is to perform the above-mentioned operations by the use of a single hydraulic cylinder actuated from a suitable source of power on the propelling tractor.

More specifically, it is a feature of this invention to provide successively acting lever means operated by a single hydraulic cylinder and so constructed and arranged that movement of the piston rod of the cylinder unit through one range of movement serves to raise and lower the frame of the implement relative to the supporting ground wheels and movement through another range serves to raise and lower the outrigger section to increase or decrease the effective span of the soil-working operation.

These and other objects and advantages of this invention will be apparent to those skilled in the art after a consideration of the following detailed description, taken in conjunction with the accompanying drawings, in which:

FIG. 1 is a plan view of the frame and actuating mechanism of a chisel plow type of cultivator embodying the novel features of this invention.

FIG. 2 is a perspective view showing the implement frame means and associated tools raised off the ground for field transport.

FIG. 3 is a view similar to FIG. 2 showing the outrigger frame and associated tools being lifted up to its raised highway transport position.

FIG. 4 is a view showing the preferred means for vertically adjusting the ground wheels 25 whereby the depth of operation of the chisel plow may be regulated.

FIG. 5 is a perspective view of the chisel plow of this invention from the rear, the chisel plow being in its field transport position.

Referring first to FIG. 1, the main frame is indicated by the reference numeral 10 and the outrigger or movable frame section is indicated by the reference numeral 11. The means hingedly interconnecting the two frame sections will be described in detail below.

The main frame 10 comprises a generally triangular construction made up of right- and left-hand rearwardly angled box sections 13 and 14, a fore-and-aft extending box section 15 and a plurality of transverse frame members 16, 17, 18 and 19, all suitably interconnected by welding or other suitable means.

The main frame section 10 is supported on a pair of ground wheels 25. Each ground wheel is mounted by suitable bearing means in a yoke 27 that comprises a pair of bars 28 connected at their upper ends to a sleeve 29 mounted for rocking movement in a pair of bearings 31 that are fixed by brackets 32 to adjacent portions of the main frame section 10. A generally upwardly extending arm 35 is fixed to one end portion of each sleeve 29 so that generally fore-and-aft swinging movement of the arm 35 acts to swing the associated wheel 25 generally vertically relative to the frame section 10, thus raising and lowering the latter relative to the ground surface. The outer end of each arm 35 carries a hammer strap 36, thus providing a bifurcated portion. A trunnion 42 is mounted in the bifurcated portion being disposed for rocking movement in apertures formed in the adjacent portions of the hammer strap 36 and the main portion of the arm 35.

For gauging the effective depth of operation I provide an adjusting crank screw arrangement which is best shown in FIG. 4. The crank screw is connected between the main frame and the outer end of each arm 35 whereby, by turning the crank, the position of the associated ground wheel may be gauged in a generally vertical direction relative to the main frame.

Each gauging crank screw arrangement is indicated in its entirety by the reference numeral 45 and includes a screw threaded rod 46 threaded into a trunnion 47 suitably supported in a bracket 48 carried by the rear main frame transverse bar 19. The intermediate portion of the rod 46 is slidable in the trunnion 42 and carries a stop sleeve 51 adapted to receive a shoulder 52 formed on the crank 53. Sufficient lost motion is provided so that raising and lowering movement may be imparted to the ground wheel arm 35.

The main and outrigger frames carry ground-working tools, the preferred form of which is illustrated as comprising a plurality of curved chisel point carrying standards 56, connected to the respective frame portions by suitable attaching means 58. Raising or lowering the frame serves to raise or lower the chisel points into and out of transport and working positions.

The outrigger frame is indicated in its entirety by the reference numeral 11. The frame 11 comprises a first fore-and-aft extending bar 62, laterally outer fore-and-aft extending bar 63 and a relatively short fore-and-aft extending bar 64, these fore-and-aft extending bars being suitably interconnected by a front transverse bar 65, and an intermediate transverse bar 66. A rear transverse bar 67 interconnects bars 62 and 63. All of the above-mentioned bars are suitably welded together or otherwise fixedly interconnected to form a rigid outrigger frame, as indicated at 11. The frame 11 is reinforced by a diagonal frame bar 68 that is welded to the several fore-and-aft extending bars.

The outrigger frame is hingedly connected to the adjacent side of the main frame 10 by a pair of hinges, each of which includes a laterally extending apertured lug 71 fixed to the outrigger frame and complementary pairs of apertured lugs 72 carried by the main frame. Cooperating hinge pins 73 interconnect the apertured lugs 71 and 72 to swingably connect the outrigger frame to a main frame. It will be seen from FIG. 1 that the main frame bar 75 carrying the pairs of lugs 72 is disposed in forwardly diverging relation with respect to the generally fore-and-aft extending axis of the main frame and that the hinge axis connecting the apertures of the lugs 71, carried by the outrigger frame, is disposed in the same angular relation with respect to the fore-and-aft extending axis of the main frame. The particular purpose of this arrangement is to offset any tendency for the tools of the outrigger frame to operate at excessive depth. By virtue of angling the hinge axis as described above, the action of the soil pressure against the teeth or soil-working tools of the outrigger frame biases the latter to tend to turn to a position in which the outrigger frame is coplanar with the main frame. The soil-working tools carried by the outrigger frame are substantially identical with the tools carried by the main frame, and further description is deemed unnecessary.

The outrigger frame carries a laterally disposed ground wheel means which is constructed and arranged substantially identical with the ground wheels described above, and hence the same reference numerals have been applied to the ground wheel associated with the laterally outer portion of the outrigger frame as the ground wheels associated with the main frame.

According to the principles of this invention, means including a single hydraulic cylinder is provided for controlling both the outrigger and the ground wheels whereby movement of the piston rod of the hydraulic unit through a first range effects the raising of the main and outrigger frames relative to the ground wheels into a field transport position, and movement of the piston rod of the hydraulic unit through a second range of movement serves to raise the outrigger frame into a generally vertical position relative to the main frame, whereby the overall width of the implement is reduced which enables the latter to pass through gateways and other relatively narrow spaces. Control mechanisms of this kind will now be described.

Disposed on the main frame is a generally triangular subframe 80 that comprises a pair of channel-like members 81 and 82 extending forwardly in diverging relation and affixed in any suitable way, as by welding, to the main frame 10. A pair of bolts 83 connect the rearmost ends of the channels 81 and 82 to the cross bar 17 of the main frame. The forward end of the channel 81 is welded to short channel section 84 and the latter is fastened by an angle bracket 85 and bolts 86 to the transverse frame bar 16. Bolts 87 fix the channel section 84 to the angle bracket 85. A second short channel section 88 is fixed by a second angle bracket 91 and bolts 92 and 93 to the right-hand angled bar 13. The forward ends of the diverging bars 81 and 82 are fixed, as by welding, to a transverse plate 94 that lies between the upper flanges of the channels 81 and 82 and the short channel sections 84 and 88.

Pivoted for lateral swinging movement between the two diverging channel bars 81 and 82 is a power cylinder 95 having at its closed end a pair of apertured lugs 96 receiving a pivot pin 97 that connects the cylinder 95 to the transverse frame bar 17. The cylinder 95 receives a piston to which a piston rod 101 is connected. The outer end of the latter is connected by a pivot pin 102 to a triangular lever 103. The lever 103 underlies the plate 94 and a plate 105, similar to the plate 94, lies below the lever 103 and is fixed to the lower flanges of the short channels 84 and 88. The generally central part of the lever 103 receives the piston rod pivot pin 102.

One end of the lever 103 is connected by a cable means 108 to the upper end of each of the ground wheel arms 35. A first cable 108 is looped at an intermediate portion to an apertured bushing 109 carried by the lever 103. One end portion 108a of the cable extends around a pair of sheaves 111a and 111b and then forwardly and upwardly to the upper end of the arm 35 where it is secured by suitable means. The other end portion 108b of the cable 108 extends over a sheave 115 and a sheave 116 and thence back to the right-hand ground wheel arm 35. Thus, when the right end of the lever 103 is swung from a rear position, as shown in FIG. 1, to a forward position, as shown in FIG. 2, a pull is exerted on the cable 108 that serves to raise the main frame 10 relative to the ground wheels, thus raising the associated tools into a transport position. In moving to the forward position the aperture 109a in the bushing 109 comes into registry with openings 110 formed in the forward ends of the flanges of the right-hand subframe bar 82, and a lock-up pin 112 can be inserted in the registering openings for holding the ground wheels in their lowered position and the main frame in its transport position. A third cable portion 108c is connected by a clamp 113 to the cable section 108a, between the associated sheave 111a and 111b, and the cable portion 108c extends outwardly to the outrigger 11, around a sheave 111c connected by swivel means to the outrigger frame. The end of the cable portion 108c then extends forwardly and is connected to the upper end of the arm 35 that swings the outrigger ground wheel. Thus, whenever the cylinder is extended to shift the lever 103 from the position shown in FIG. 1 to the position shown in FIG. 2, the outrigger frame is raised into a field transport position as well as the main frame.

In implements of this type it is also desirable to use power to additionally raise the outrigger frame into a raised position relative to the main frame so as to narrow the implement to facilitate its transport through gates and other narrow spaces. According to the present invention this can be done in the following way.

With the lock-up pin 112 disposed in the registering openings 109a and 110, the pin 112 becomes a pivot for the right end of the lever 103 and extension of the piston rod 101 to its second or forwardmost position serves to swing the lever 103 in a clockwise direction (FIG. 1) about the pin 112 as a center and carry the left end of the lever 103 forwardly, exerting a pull on a second cable 118. As best shown in FIG. 1, one end of this cable is anchored by a pair of clamps 119 to the channel 81 and is trained over a sheave 121 journaled on a hollow bushing 122 carried in the left end of the lever 103. From the sheave 121 the cable 118 extends rearwardly to and passes around another sheave 124 swingably connected with a bracket 125 fixed to the rear bar 19. From the sheave 124 the cable 118 extends laterally outwardly and is connected at its outer end to an outrigger lift arm 131 that is pivoted at 132 to a bracket 133. The latter includes a pair of generally parallel plates 134 and 135 that are bolted, to the outrigger frame bar 65. Carried by the bracket plates 134 and 135 is a stop member 136 against which the innermost end of the lift arm 131 bears when the outrigger frame is in its horizontal position. The stop member 136 is so located that when the outrigger frame is in its horizontal position the lift arm 131 extends generally upwardly (FIG. 2) so as to provide sufficient leverage that a pull exerted on the outrigger frame serves to raise the latter out of its horizontal position, and after the outrigger frame is raised part way, the lift arm 131 becomes aligned with the cable 118 so that a continued pull exerted on the cable serves to complete the raising of the outrigger frame. In its completely raised position the bar 66 of the outrigger frame lies between the two apertured arms 141 of a lock-up yoke 142 fixed to an elongated bracket 140 that is welded rigidly to the main frame at 143 and is reinforced by a brace 144. A lock-up pin 145 is inserted through the openings in the yoke 142 to hold the outrigger locked in its raised position. After the pin 145 has been inserted in the yoke 142 and the outrigger frame locked in its raised position, the pressure in the cylinder 95 may be released since the lock-up yoke holds the outrigger frame raised to its transport position.

While only one form of the invention has been shown, it should be recognized that other forms and variations may occur to those skilled in the art without their departing basically from the broad general principles disclosed herein. Therefore it should be understood that the present description and disclosure was given for the purposes of clearly and concisely illustrating the principles of the invention and there is no intention to limit or narrow the invention beyond the broad general scope as set forth in the appended claims.

What is claimed is:

1. An agricultural implement comprising a main frame adapted to be propelled forwardly over the ground, at least one outrigger frame, hinge means connecting said outrigger frame to one side of the main frame for swinging about a generally fore-and-aft extending axis, ground-working tools connected to both said main frame and said outrigger frame, a power cylinder carried by one of said frames and including an extensible and retractable piston rod, a link pivoted at its midportion to the outer end of said piston rod, ground-engaging means movably connected with said main frame and shiftable relative thereto for raising and lowering said frame, means connecting one end portion of said link with said ground wheels, means connecting the other end portion of said link with said outrigger frame, and means operable to optionally lock one or the other end of said link against shifting.

2. In an agricultural implement, a frame having a movable section, ground wheels supporting said frame and movable relative to the frame to raise and lower the latter, a hydraulic cylinder mounted on the frame and including an extensible and retractable piston rod, a lever pivoted at a midpoint on the outer portion of said piston rod, means connecting one end of said lever to said ground wheels, means connecting the other end of said lever to said movable frame section, and optionally operable means for holding either end of said lever against movement whereby all of the movement of the piston is transmitted to the other end of said lever.

3. In an agricultural implement, a frame having a movable section, ground wheels supporting said frame and movable relative to the frame to raise and lower the latter, a hydraulic cylinder mounted on the frame and including an extensible and retractable piston rod, a lever pivoted at a midpoint on the outer portion of said piston rod, means connecting one end of said lever to said ground wheels, means connecting the other end of said lever to said movable frame section, means releasably carried by said frame and adapted to releasably engage said other end of said lever so as to hold that end of the lever against movement, whereby extending movement of said piston rod acts to shift said one end of the lever and raise the frame relative to the ground wheels, and means releasably carried by said frame and releasably engageable with said one end of said lever in the position of the latter when the frame is raised on said ground wheels for holding said one end of the lever against further movement, whereby further extending movement of said piston rod serves to shift said lever and raise said movable frame section.

4. In an agricultural implement, a frame having a movable section, ground wheels supporting said frame and movable relative to the frame to raise and lower the latter, a hydraulic cylinder mounted on the frame and including an extensible and retractable piston rod, a lever pivoted at a midpoint on the outer portion of said piston rod, means connecting one end of said lever to said ground wheels, means connecting the other end of said lever to said movable frame section, a cylinder-supporting subframe to which the closed end of the cylinder is connected, said lever lying in closely spaced relation with said subframe, each end of said lever being apertured, there being openings in said subframe adapted to register with the apertures of said lever in selected positions of the latter, and pin means releasably disposable in said registering openings.

5. An agricultural implement as defined in claim 4, further characterized by said pin means including a pin insertable in the associated opening in one end of said lever for locking said lever to the subframe in a position holding said ground wheels in a lowered position.

6. An agricultural implement as defined in claim 5, further characterized by a second pin insertable in the openings in said subframe and the other end of said lever to establish a pivot axis about which said lever may swing when said ground wheels are lowered.

7. An agricultural implement as defined in claim 3, further characterized by means carried by said frame and engageable directly with said movable frame section for locking the latter in its raised position.

8. In an agricultural implement, a frame having a movable section, ground wheels supporting said frame and movable relative to the frame to raise and lower the latter, a hydraulic cylinder mounted on the frame and including an extensible and retractable piston rod, a lever pivoted at a midpoint on the outer portion of said piston rod, means connecting one end of said lever to said ground wheels, means connecting the other end of said lever to said movable frame section, adjustable stop means connected between said frame and said ground wheels for determining the lowered position of said frame, first releasable pin means pivotally connecting said other end of said lever with said frame, whereby extension of said piston rod serves to swing said lever in a direction to raise said frame relative to said ground wheels, and second releasable pin means pivotally connecting said one end of said lever, when in a position raising said frame relative to said ground wheels, to said frame, whereby further extension of said piston rod serves to swing said lever about said second-mentioned pin means and raise said movable frame section.

9. An agricultural implement as defined in claim 8, further characterized by a part fixedly carried by said frame and engageable with said movable frame section in its raised position, and means carried by said part for locking said movable frame section thereto.

10. In an agricultural implement, a frame including a movable section, ground wheels movably connected with said frame and shiftable between an operative position and a transport position, a first shifting means connected with said movable frame section, a second shifting means connected with said ground wheels, and third means mounted on said frame and connected with said first and second means to shift them, said third means including an arm, a source of power mounted on said frame and connected to a midpoint of said arm, said first means being connected to one end of said arm and said second means being connected to the other end of said arm, and means operable to optionally lock one or the other end of said arm against shifting.

References Cited by the Examiner
UNITED STATES PATENTS

| | | | |
|---|---|---|---|
| 2,699,715 | 1/1955 | Shelton | 172—708 |
| 2,725,703 | 12/1955 | Roseman | 56—7 |
| 2,754,739 | 7/1956 | Estes | 172—708 X |
| 2,828,680 | 4/1958 | Johnson | 172—310 |
| 2,960,346 | 11/1960 | Hunter | 172—502 X |
| 2,982,080 | 5/1961 | Martin | 172—456 X |
| 3,003,789 | 10/1961 | Calkins | 172—456 X |
| 3,156,306 | 11/1964 | Dunker | 172—456 |

ABRAHAM G. STONE, *Primary Examiner.*

ANTONIO F. GUIDA, *Examiner.*

J. R. OAKS, *Assistant Examiner.*